US00RE34163E

United States Patent [19]

Aubrey et al.

[11] E Patent Number: Re. 34,163

[45] Reissued Date of Patent: Jan. 19, 1993

[54] SYMMETRICAL FAULT CURRENT DETECTOR

[75] Inventors: David R. Aubrey, Saughall; Ian Jameson, Wirral, both of United Kingdom

[73] Assignee: Electricity Association Services Limited, London, United Kingdom

[21] Appl. No.: 668,101

[22] Filed: Mar. 12, 1991

Related U.S. Patent Documents

Reissue of:

[64] Patent No.: 4,797,775
Issued: Jan. 10, 1989
Appl. No.: 854,246
Filed: Apr. 21, 1986

[30] Foreign Application Priority Data

May 20, 1985 [GB] United Kingdom ..... 8512746

[51] Int. Cl.[5] ..... H02H 3/087
[52] U.S. Cl. ..... 361/93; 361/87
[58] Field of Search ..... 361/93, 94, 95, 87

[56] References Cited

U.S. PATENT DOCUMENTS 2,316,289 4/1943 Sandstrom ..... 361/93
3,962,606 6/1976 Burns et al. ..... 361/93 X
4,454,557 6/1984 Hurley ..... 361/93
4,544,980 10/1985 Serrie et al. ..... 361/94 X
4,553,188 11/1985 Aubrey ..... 361/93
4,583,004 4/1986 Yearsin ..... 361/94

*Primary Examiner*—Steven L. Stephan
*Assistant Examiner*—Adolf Berhane
*Attorney, Agent, or Firm*—Antonelli, Terry, Stout & Kraus

[57] ABSTRACT

Excess currents due to faults in an electrical power system are generally larger than excess currents due to the magnetization of distribution transformers. Discrimination has hitherto relied on a threshold detector. Magnetizing currents are, however, asymmetrical, whereas fault currents are symmetrical. A detects symmetrical current waveforms on a conductor 1 and thus discriminates between a fault and a magnetizing excess current. A resistor 4, placed across the output terminals of a bridge rectifier 3 has a resistance selected so that the voltage across it exceeds the breakdown voltage of trigger diodes 7 and 8 when the current in conductor 1, in any half cycle, exceeds a desired maximum. Capacitors 13 and 14 will thus only both charge up in response to excessive symmetrical current. A logic control 23 is connected via lines 21 and 22 to detect such a condition.

10 Claims, 1 Drawing Sheet

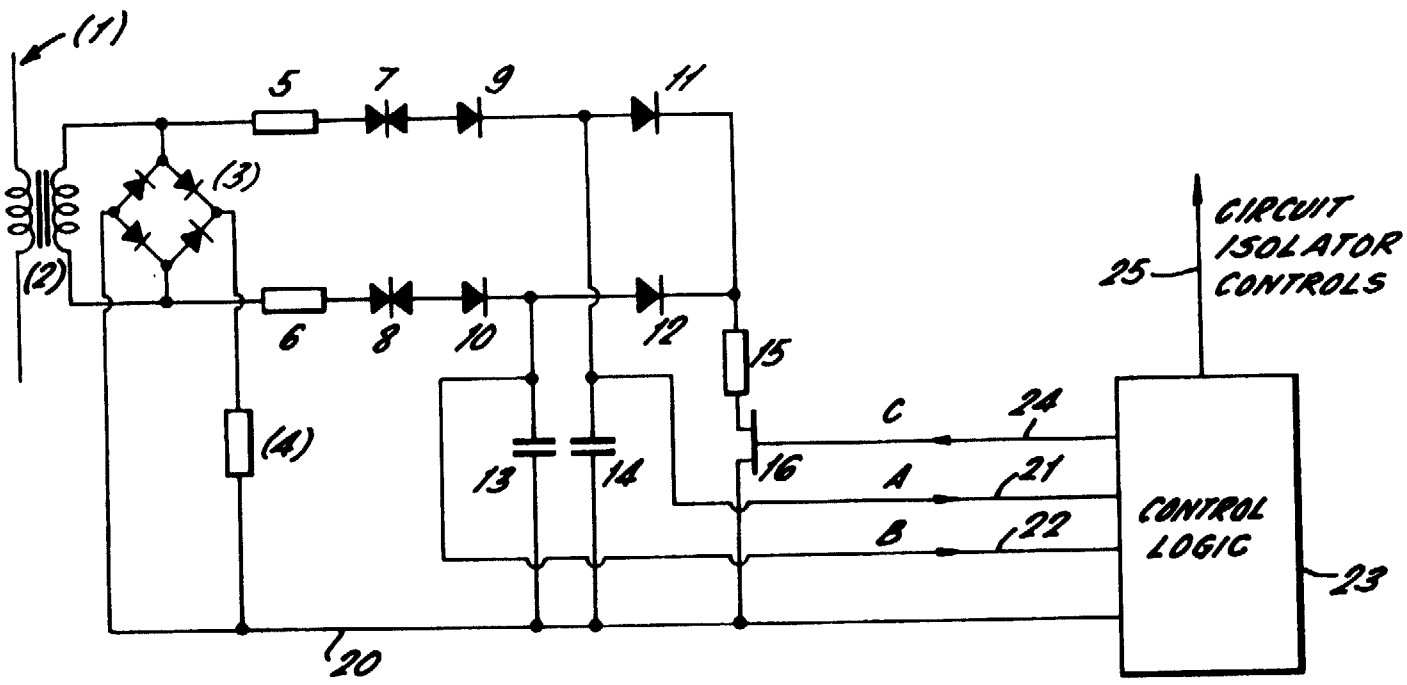
CIRCUIT ISOLATOR CONTROLS
CONTROL LOGIC
23
25
24
21
22
C
A
B
15
16
11
12
14
13
9
10
7
8
5
6
(4)
(3)
(1)
(2)
20

SYMMETRICAL FAULT CURRENT DETECTOR

Matter enclosed in heavy brackets [ ] appears in the original patent but forms no part of this reissue specification; matter printed in italics indicates the additions made by reissue.

BACKGROUND OF THE INVENTION

The present invention is concerned with the detection of fault currents in electricity power lines. It is a common practice for electrical power systems to be equipped with means for detecting excessive currents so that faulty parts of the power system can be automatically isolated. Such devices may be over current relays or sectionalisers (such as that disclosed in our U.S. Pat. No. 4,553,188). Excessive current can be detected by any means that recognizes that the magnitude of the current in the power system has exceeded a given threshold value.

A problem with existing fault and over current detection systems is that they are prone to be actuated in response to short term current excursions which may occur in a normal healthy [powre] *power* system. A particular problem is that resulting from transformer magnetising inrush currents which occur when a section of the distribution system is energized, resulting in the energising of one or more distribution transformers. Former current detection devices have typically been set with their threshold values sufficiently high to ensure that transformer magnetising inrush currents do not actuate them. Such threshold values may then be considerably higher than the ideal threshold value which would be chosen to detect all fault currents if transformer magnetisting inrush currents were not a problem. As a result the overall protection of the power system is sometimes not as good as would be desirable.

SUMMARY OF THE INVENTION

It is a purpose of the present invention to provide a [faul] *fault* current detector for a power system where the threshold value can be set in accordance with the ideal requirements for the protection of the system, without having to be made unduly high to accommodate transformer magnetising inrush currents.

In accordance with the present invention, a fault current detector comprises current transformer means to provide a signal representative of current flowing in an alternating current power line and means responsive to said signal to provide a fault current indication only if the alternating current flow represented by said signal exceeds a predetermined threshold in each polarity. Preferably, said means responsive to said signal is independently responsive to the alternating current flow in half-cycles of respective polarity of the supply waveform and provides a respective indication of the flow in each polarity exceeding a predetermined threshold.

This invention is based on the understanding that the excess currents that can flow in an electrical power system due to a fault are symmetrical, having positive and negative half-cycles of current which are substantially of the same magnitude, or at least both of an excessively large magnitude. On the other hand, transformer magnetising inrush current is commonly characterised by having current excursions of one polarity which are substantially greater than the current excursions of the opposite polarity. It is accordingly possible to distinguish between excess currents flowing in a power line which are due to inrush currents and those which are due to faults, by checking for the symmetry of the fault current. Only if the fault current is symmetrical, in so far as there is an excessive current excursion in both polarities, is a true fault indicated.

In a preferred example, said means responsive to said signal comprises a full wave rectifier rectifying the output signal of the current transformer means, a resistance connected across the output terminal of the rectifier and a respective threshold switch connected to each input terminal of the rectifier and arranged to be triggered in response to the voltage between the respective input terminal and a common output terminal of the rectifier exceeding a predetermined threshold voltage.

In another aspect, the present invention provides a method of detecting a fault current in a power line carrying an alternating current supply comprising monitoring both polarities of the current flow in the power line and responding only to a symmetrical current above a threshold level to provide a fault current indication. [dr]

BRIEF DESCRIPTION OF THE DRAWING

An example of the invention will now be described with reference to the accompanying drawing which is a circuit diagram of a fault current detector embodying the present invention.

DETAILED DESCRIPTION

Referring to the drawing, a current transformer 2 is illustrated monitoring the current flowing in a electrical supply line or conductor 1. The secondary winding of the current transformer 2 is connected to the input terminals of a full wave bridge rectifier 3. The output terminals of the bridge rectifier 3 are connected across a resistor 4. One output terminal of the bridge rectifier 3 is connected to a common line 20. One of the input terminals of the bridge rectifier 3 is also connected by means of a resistor 5 in series with a bi-directional trigger diode 7, a diode 9 and a capacitor 14, to the common line 20. Similarly, the other input of the bridge rectifier 3 is connected by means of a resistor 6 in series with a bi-directional trigger diode 8, a diode 10 and a capacitor 13 also to the common line 20.

The trigger diodes 7 and 8 are devices which break down to present a low impedance to current in the event of a voltage across the trigger diode in excess of a predetermined threshold. The trigger diodes recover automatically once the current through them drops to zero.

The circuit operates as follows. The value of the resistor 4 across the output terminals of the bridge rectifier 3 is selected so that the voltage across the resistor exceeds the break down voltage of the trigger diodes 7 and 8 when the current in any half-cycle of the mains waveform in the power conductor 1 exceeds a desirable maximum level. Initially, the capacitors 13 and 14 are discharged so that substantially the full voltage drop across the resistor 4 is developed across each of the trigger diodes 7 and 8 on respective alternate half-cycles of the mains supply. In the event that the supply current in any particular half-cycle exceeds the desired maximum, so that the voltage across the resistor 4 exceeds the switching threshold, a respective one of the trigger diodes 7 and 8 breaks down, depending on the polarity of the supply waveform. When the trigger breaks down, current flows through the respective forward bias diode 9 or 10 to charge up the respective capacitor 14 or 13. It can be seen, therefore, that a respective one of the capacitors 14 and 13 is charged dependent on the polarity of the half-cycle of the supply waveform which exceeds the switching threshold.

Lines 21 and 22 from the capacitors 14 and 13 respectively supply logic signals respresentative of the state of charge of these capacitors to a control logic unit 23. The control logic unit 23 is arranged to monitor the logic state on line 21 and 22 and to provide a fault indication only if both lines 21 and 22 are in states indicative of excessive current excursions in both polarities of the supply waveform. If only one of lines 21 and 22 indicates an excessive current excursion, it is assumed that this is due to a magnetising inrush current and the control logic 23 is arranged not to provide a fault indication.

Referring again to the drawing, the circuit may be reset by discharging the capacitors 13 and 14. This is achieved by a reset signal on line 24 from the control logic unit which makes a power field effect transistor 16 conduct thereby short circuiting the two capacitors 13 and 14 via respective diodes 12 and 11 and the resistor 15. When the circuit is in normal operation awaiting a fault current, the reset line 24 is controlled to keep the transistor 16 non-conducting.

The control logic unit 23 can provide control signals on line 25 for operating circuit breakers, sectionalisers, etc. in the usual way in response to detection of a fault current. In normal operation, the control logic will respond to only one of lines 21 and 22 indicating an excessive current of only one polarity, by generating a reset signal on line 24 to reset the capacitors. In response to both lines 21 and 22 indicating excessive current in both polarity of the supply waveform, the control logic unit effects an appropriate response, e.g. to isolate the supply line, and substantially resets the detector circuit as before.

It can be seen that electrical connections may be made to any point of the circuit of the drawing for the purpose of making timing and synchronisation information available to the control logic 23. Further, it may be appreciated that the current transformer 2 need not be a high quality protection current transformer. It is only necessary for the transformer 2 to provide sufficient energy output in response to an over current to drive the voltage across the resistor 4 above the trigger threshold voltage of the diodes 7 and 8. Provided the current transformer 2 provides sufficient energy for this purpose, it does not matter if a small transformer is used which magnetically saturates.

The circuit illustrated in the attached drawing is only an example of possible circuits which can embody the present invention. The trigger diodes 7 and 8 may be replaced by any other appropriate means of switching response to a voltage exceeding a threshold voltage.

The described example and other embodiments of the invention may be particularly useful when used in an automatic sectionaliser as part of the over current detection circuit, thereby rendering the sectionaliser more sensitive to actual (symmetrical) fault currents but insensitive to magnetising inrush currents.

We claim:

1. A fault current detector comprising:

current transformer means adapted to be inductively coupled to an alternating current power line to provide a signal representative of current flowing in the alternating current power line; and means responsive to the signal to provide a fault current indication if the alternating current flow represented by the signal exceeds a predetermined threshold in each polarity but not to provide the fault current indication if the alternating current flow exceeds the predetermined threshold in only one polarity, *said means responsive to the signal being independently responsive to the alternating current flow in half-cycles of respective polarity of the alternating current flow to provide a respective indication of the flow in each polarity exceeding the predetermined threshold and comprising a full wave rectifier for rectifying the output signal of the current transformer means, a resistance connected across the output terminals of the rectifier and a respective threshold switch connected to each input terminal of the rectifier and arranged to be triggered in response to the voltage between the respective input terminal and a common output terminal of the rectifier exceeding the predetermined threshold voltage.*

[2. A detector as claim in claim 1 wherein said means responsive to the signal is independently responsive to the alternating current flow in half-cycles of respective polarity of the alternating current flow to provide a respective indication of the flow in each polarity exceeding the predetermined threshold.]

[3. A detector as claimed in claim 2 wherein said means responsive to said signal comprises a full wave rectifier for rectifying the output signal of the current transformer means, a resistance connected across the output terminals of the rectifier and a respective threshold switch connected to each input terminal of the rectifier and arranged to be triggered in response to the voltage between the respective input terminal and a common output terminal of the rectifier exceeding the predetermined threshold voltage.]

[4. A method of detecting a fault current in a power line carrying an alternating current comprising:

monitoring both polarities of the alternating current in the power line; and initiating a fault current indication in response to the monitoring of current above a threshold level in each polarity of the alternating current but not in response to the monitoring of current above the threshold in only one polarity.]

*5. A detector as claimed in claim 1, wherein each of the respective threshold switches comprises a series connection of a bi-directional trigger diode, a second diode, and a capacitor, and said respective threshold switches are connected by a common line to the common output terminal of the rectifier.*

*6. A detector as claimed in claim 5, wherein said means responsive to said signal further comprises means for discharging the capacitors to reset the detector.*

*7. A detector as claimed in claim 5, wherein said means responsive to said signal further comprises respective output lines from the capacitors for supplying logic signals representative of the state of charge of the respective capacitors to a control logic unit adapted to monitor the logic state on said output lines, to provide a fault indication only if both, of said output lines are in states indicative of excessive current excursions in both polarities of the supply waveform.*

*8. A detector as claimed in claim 7, wherein said means responsive to said signal further comprises means for discharging the capacitors to reset the detector.*

*9. A detector as claimed in claim 7, wherein said means responsive to said signal further comprises respective diodes*

*connected to said capacitor, a second resistance, and a power field effect transistor coupled by said second resistance to both said respective diodes and responsive to a reset signal from the control logic unit to become conducting, thereby to discharge both said respective capacitors via said respective diodes and said resistor.*

*10. A detector as claimed in claim 9, wherein the control logic unit is arranged to respond to a signal on only one of said respective output lines, indicating an excessive current of only one polarity, by generating a reset signal on said reset line.*

* * * * *